Nov. 10, 1959 J. M. EARLY 2,912,371

METHOD OF FABRICATING SEMICONDUCTIVE TRANSLATING DEVICES

Filed Dec. 28, 1953

INVENTOR
J. M. EARLY
D. H. Wilson, Jr.
ATTORNEY

United States Patent Office 2,912,371

Patented Nov. 10, 1959

2,912,371

METHOD OF FABRICATING SEMICONDUCTIVE TRANSLATING DEVICES

James M. Early, Morristown, N.J., assignor to Bell Telephone Laboratories, Incorporated, New York, N.Y., a corporation of New York Application December 28, 1953, Serial No. 400,412

8 Claims. (Cl. 204—143)

Figures 1, 2:
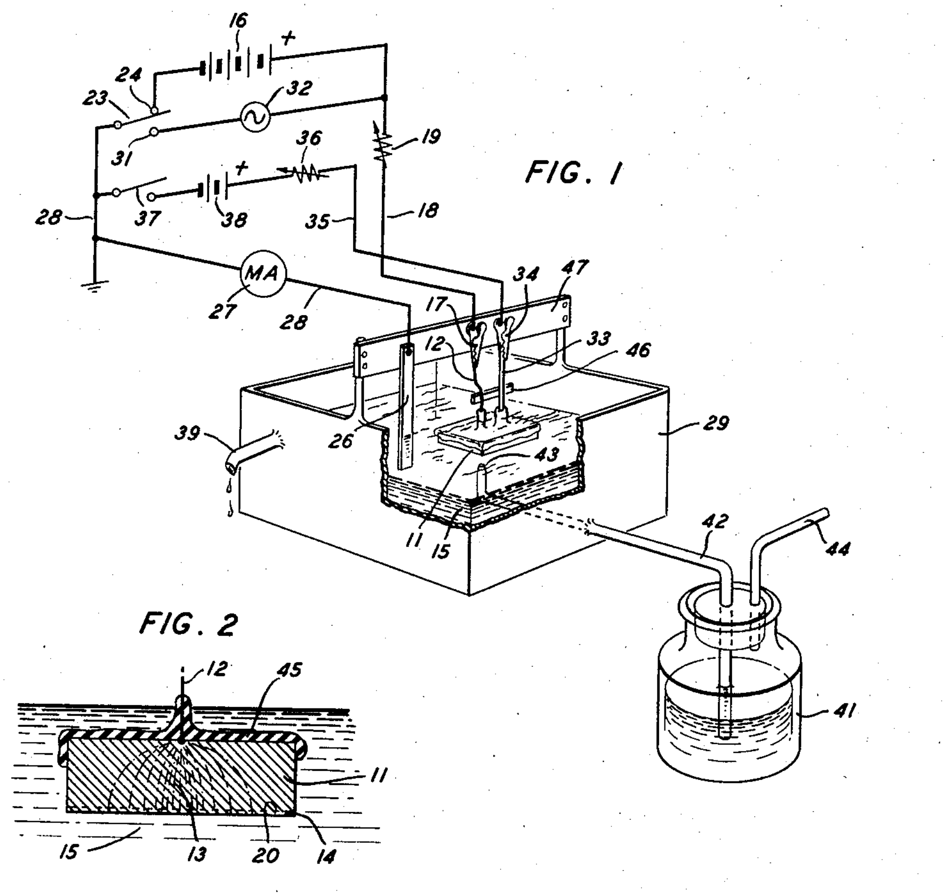
Figure 3:
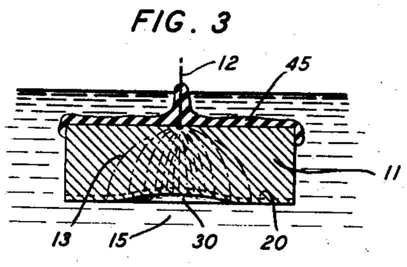

This invention relates to methods of processing semiconductors and more particularly to methods of electrolytically etching semiconductors.

Recently a number of semiconductive devices have been evolved which require semiconductive bodies having irregular configurations. For example, in W. Shockley application Serial No. 243,541, filed August 24, 1951, now Patent 2,744,970, issued May 8, 1956, there is disclosed a device having a semiconductive body with a reduced cross section intermediate massive portions, also it has been found desirable in producing transistors with emitter and collector connections on opposite faces of a semiconductor body to produce a thin section within the body and thereby provide a narrow separation between the connections. Devices having these irregular semiconductive body forms have heretofore been formed by cutting and abrading operations which require extremely intricate and delicate operations and result in a low yield of satisfactory product. This invention is directed to methods of preferentially etching semiconductive bodies whereby body shapes are produced which were heretofore attainable only by cutting and abrading.

The principal objects of the invention are to facilitate the electrolytic etching of semiconductors, to control preferentially the rate of etching over a semiconductive surface exposed to an electrolyte, and to enable semiconductive bodies to be shaped by electrolytic etching.

One feature of this invention resides in accelerating the rate of etching at a desired region in a semiconductive body by causing etching current to flow at the surface of that region at a higher rate than it flows at the other surface regions while the surface of the body is immersed in a suitable electrolytic etchant.

The injection of minority charge carriers into a region of a body of anodically biased n-type semiconductive material which is exposed to a suitable electrolytic etchant to increase the etching current density at the surface of that region and thus the rate of etching at that surface constitutes another feature of this invention.

Another feature comprises preferentially etching a region of a semiconductive surface exposed to an electrolyte by directing the ohmic flow of current in the body to that surface region.

In one of its more specific aspects this invention involves dimpling an n-type semiconductive surface by an electrolytic etching technique wherein the electrolyte is made negative with respect to the semiconductor and holes are injected into the semiconductor by a positively biased emitter electrode engaging the semiconductive body over a restricted portion of its surface. The emitter electrode may be of small diameter and, in the case of a wafer type body to be dimpled on a major surface, may be placed on the major surface opposite that surface to be dimpled. The emitter bearing surface and emitter are masked or otherwise isolated from contact with the electrolyte. As will be explained more fully below, a barrier to current flow exists at the interface between the n-type semiconductor and some electrolytes when the electrolytes are biased negatively with respect to the semiconductor. This barrier inhibits the flow of etching current and thus the etching action at the surface. The injection of minority charge carriers into a restricted region by the above technique effectively breaks down the barrier in that region and permits etching to take place at an accelerated rate.

The above and other objects and features of this invention will be more fully appreciated from the following detailed description when read in conjunction with the accompanying drawings in which:

Fig. 1 is a perspective schematic representation of apparatus for the preferential electrolytic etching of semiconductors in accordance with this invention; and Figs. 2 through 5 illustrate the development of a cavity during the preferential etching operations of this invention, and depict successive stages of the cavity growth.

Preferential electrolytic etching of semiconductive surfaces has been suggested heretofore by M. Sparks and is disclosed in his patent application Serial No. 239,609, filed July 31, 1951, now Patent 2,656,496 which issued October 20, 1953. As disclosed in that patent a semiconductive body containing regions of n- and p-type material can be preferentially etched by applying a bias across the junction between those regions. Thus when a p–n junction is biased in the reverse direction, i.e. when the n-type material is positive with respect to the p-type material, the n-type material etches faster since it is more anodic than the p-type material. Conversely, when the junction is forward biased, the p-type material is more anodic and etches at a greater rate than the n-type material.

The present invention permits the preferential electrolytic etching of a semiconductive surface of normally uniform electrical characteristics. It embraces the etching of both n- and p-type semiconductive surfaces and contemplates effecting the preferential etching by a control of the amount of etching current which flows at the various portions of the surface which are exposed to electrolyte.

It has been observed that a barrier exists in the region of the interface between an anodic n-type semiconductive surface and an electrolyte similar to an n–p junction in a semiconductor. The order of magnitude of the saturation current density at the semiconductor-electrolyte interface is quite similar to that observed for p–n junctions. This barrier inhibits the flow of etching current and hence the rate of dissolution of the anodic n-type semiconductive surface when the potential difference between the surface and the electrolyte is maintained below the level which destroys the barrier effect, i.e. the barrier is biased in its high resistance direction when the n-type semiconductor is positive with respect to the electrolyte. The impedance at the interface can be reduced almost to that level at which the bulk impedance is the limiting factor on the amount of charge which flows by the injection of minority charge carriers, holes, into the semiconductive body in the vicinity of the barrier. Holes injected into n-type semiconductors in general flow in the semiconductor by diffusion and follow radial paths 13 emanating from their source 12 as illustrated in Fig. 2. The distance which these holes flow within the semiconductor prior to their extinction is limited due to trapping and recombination with electrons normally present therein. The mean path length of a hole in any particular n-type semiconductor is termed the "diffusion length" of that material and is at the present stage of development readily made two millimeters or greater in length. The "diffusion length" is also defined as that distance in which the minority charge carrier density decays to $1/e$ of its original value.

A preferential electrolytic etching of the surface of an n-type semiconductive body can be effected in accordance with this invention by injecting holes into the body in a limited region within a diffusion length of the surface at which etching is sought while that surface is maintained anodic with respect to a contacting electrolyte. For example, as shown in Figs. 2 through 5 a sharp depression can be produced in an n-type semiconductive body 11 by an electrolytic etching operation by applying a hole emitting electrode 12 of restricted extent to the body at such a location that its hole flow, represented by flow lines 13, to the barrier at the interface 14 between the body 11 and the electrolyte 15 is concentrated at the region to be eroded. The space charge layer of the barrier extends to line 20. During this etching operation, the surfaces in proximity to the emitter which are not to be etched and the emitter electrode and leads are maintained out of contact with the electrolyte by suitable means.

A circuit enabling a number of etching techniques to be practiced is shown in Fig. 1. This circuit is arranged for etching an anodic n-type body with a single emitter by connecting emitter 12 to the positive terminal of direct-current source 16 through terminal clip 17, lead 18, and adjustable current limiting resistance 19. The negative terminal of source 16 is connected to a suitable inert electrode 26, for example one of platinum, stainless steel, graphite, or tantalum, in electrolyte 15 through terminal 24 of switch 23, milliammeter 27, and lead 28.

Flow lines in Figs. 2 through 5 indicate the hole flow within the semiconductive body. Initially the body has a plane surface and radial hole flow from the emitting point, limited somewhat by recombination and trapping, produces a hole distribution at the semiconductive surface which has its greatest concentration immediately beneath the emitter with a diminution at a rate which increases as a function of the distance from the point of maximum concentration until the flow lines have a length equal to a diffusion length at which point the concentration is $1/e$ of its original value and diminishes at a very high rate. Etching progresses at a rate proportional to the hole current and therefore the material under the emitter erodes most rapidly. This erosion results in a cavity 30 extending toward the emitter which further concentrates the hole flow toward the deepest portion of the cavity and thereby further accelerates the etching action in that region. Figs. 2, 3, 4, and 5 illustrate the effects of this etching operation at successive etching intervals.

This form of etching operation is most favorably realized when the etching efficiency is high, i.e. when the current flowing is highly effective to ionize germanium and is relatively ineffective in producing side reactions such as the evolution of oxygen from aqueous electrolytes.

In Fig. 1 the etching is carried out in a bath 15 contained in a tank 29 in which the semiconductive specimen is completely immersed. However, it is to be understood that the surface to be etched can be immersed by other expedients. For example, a stream of etchant can be directed against the surface and then permitted to fall away from it. In such an arrangement a metallic nozzle can be employed to control the stream and function as a cathode and masking of the electrode and adjacent semiconductive surfaces is dispensed with.

Any electrolyte may be used which permits the removal of the oxidation products of the semiconductor. The simplest electrolytes which meet this requirement are those in which the semiconductor forms soluble compounds. Examples of suitable electrolytes for the etching of germanium are aqueous solutions of any one of the following substances: potassium hydroxide, sodium hydroxide, sulfuric acid, sodium nitrite, and potassium chloride. Wax, polystyrene, and other nonconductors may be employed to mask and insulate the leads, contacts, and semiconductive surfaces immediately adjacent the contacts from these electrolytes.

While the etching of n-type semiconductors has been described utilizing a constant unidirectional current, it is to be understood that a pulsating unidirectional current or even an alternating current can be employed to realize the advantageous results noted above. Alternating current can be applied to the specimen shown in Fig. 1 by closing switch 23 on contact 31 so that the etching circuit then comprises the same path as set forth above for direct-current etching with the exception that alternating-current source 32 is substituted in place of direct-current source 16.

The total etching which occurs in any of these processes depends upon the total quantity of conventional current flowing from the semiconductive surface to the electrolyte. This is also so when alternating current is applied to the emitter since its junction blocks reverse current. The number of electrons required to remove one semiconductor atom under specific conditions can be determined by monitoring the flow and determining the weight lost by the semiconductor when etched under those conditions. This number is termed the effective valence of the semiconductor in etching. Germanium etched as disclosed herein has an etching valence of about four in a ten percent potassium hydroxide solution at room temperature indicating that substantially no side reactions take place. Knowing the etching efficiency or etching valence of a particular combination of electrolyte and semiconductor, the amount of material removed can be determined by monitoring the total charge which flows while the semiconductor is anodic.

The etching operation as employed to form depressions in an initially substantially plane semiconductive surface can be performed with variants of the above technique. For example, a second electrode 33 can be applied to the semiconductive body 11. This second electrode 33, which can be termed a base electrode, is so constructed that it is not an emitter of holes, i.e. it is ohmic or symmetrical in its conduction characteristics. The semiconductor is biased anodic with respect to the electrolyte by biasing the base 33 positive. This can be done by connecting base 33 to terminal clip 34, lead 35, adjustable resistor 36, source of direct potential 38, switch 37, and lead 28. In the absence of hole emission by the electrode no current other than the slight leakage current of the barrier at the semiconductor electrolyte interface 14 flows and essentially no etching occurs. However, when the barrier impedance is lowered by holes injected from the emitter 12, which may be supplied from a source of either alternating or direct current, the current which flows through the region affected comprises a combination of the emitter current and the current through the base electrode. This combined current is greater than that which flows when no base current flows and yet is controlled as to the area through which it flows and as to its distribution over that area by the degree of reduction of barrier impedance by holes injected by the emitter. Thus, control is maintained over the preferential etching operation yet the speed with which the operation can be performed is increased over that realized when the emitter is the sole source of current.

Preferential etching employing an emitter and a base electrode has been practiced on a ten mil one-quarter inch square of five ohm centimeter n-type germanium. In this instance an 80 mil diameter indium contact was alloyed to a suitably prepared major surface of the wafer to form a rectifying emitter connection and was centered within a ring of antimony doped gold wire which was also alloyed to the surface to provide an ohmic base contact. The opposite major surface of the wafer was immersed in a ten percent solution of KOH. Etching was initiated with the emitter biased positive with respect to the electrolyte (three volts positive with respect to a tantalum cathode in the electrolyte) and 25 milliamperes of etching current flowed. When the ohmic contact was connected into the circuit and the current through it limited to 50 milliamperes by resistor 36 and battery 38 poled positive with respect to the electrode in the electrolyte, the etching current increased to 48 milliamperes and the preferential etching increased proportionally. The cavity resulting from this operation was about 80 mils in diameter.

Another means of expediting the etching action which may be employed on either a single or double electrode specimen involves agitating the electrolyte 15 in the vicinity of the surface region on which the etching action is concentrated. This agitation removes any accumulation of air bubbles or electrolysis products from the surface. An effective method of agitating the electrolyte is to direct a fine jet of electrolyte at the spot where the cavity 30 is expected to form. Such a jet can be provided as illustrated in Fig. 1 by supplying fresh electrolyte from a reservoir 41 through a suitable tube 42, terminating in a nozzle 43 which is aimed appropriately so that the jet strikes the desired spot on the semiconductor surface. The impelling force for the jet can be provided conveniently by air pressure fed to the closed reservoir through tube 44 from a source (not shown) which maintains a constant pressure, for example, about 2 pounds per square inch. The excess electrolyte within tank 29 due to the jet is drawn off through overflow 39.

Considering a specific example of the above process, cavities about seven mils deep having an essentially uniform diameter of about four mils have been formed in wafers of n-type germanium about eight mils thick. These specimens were initially 10 x 50 x 125 mil, 6 ohm-centimeter, single crystal germanium bodies 11 to one face of which a 20 mil diameter antimony doped gold wire was bonded by the techniques set forth in W. G. Pfann's patent applications Serial No. 184,869 and Serial No. 184,870, both filed September 14, 1950, the first of which is now Patent 2,792,538, issued May 14, 1957. The immediate vicinity of the bond was masked with polystyrene. The unmasked germanium surface was then chemically etched to remove all cutting and polishing debris and to expose the undamaged crystal structure in a solution comprising 15 parts of acetic acid, 25 parts of nitric acid (1.42 specific gravity), 15 parts of hydrofluoric acid (48 percent) and sufficient liquid bromine to saturate the above. The etched surface was washed and dried. It should be noted that an undisturbed crystal structure in the surface being electrolytically etched exhibits an enhanced barrier action and reduces the tendency toward the formation of pits during the electrolytic etch. A rectifying emitter connection 12 was then formed by bonding a two mil diameter gallium doped gold wire as above to the same face of the wafer 11 as the 20 mil wire. Extended portions of the wires were secured to a common support 46, as by gluing them to a polymethyl methacrylate slab, to provide an assembly which could be handled. The face of the wafer with the bonds on it and the portion of the bonded wires adjacent the wafer were masked with polystyrene 45 leaving the opposite face exposed.

Figure 5:
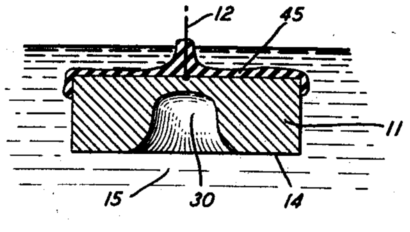
Figure 4:
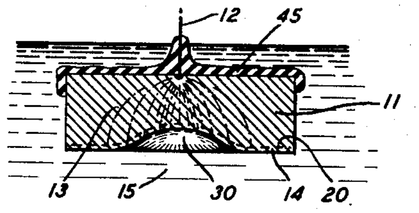

The assembly as described above was mounted with the exposed germanium face immersed in a ten per cent potassium hydroxide-water solution by securing the bonded wires to alligator clips 17 and 34 or the like which in turn were rigidly supported with respect to the tank 29 containing the etchant by an insulating member 47. A current of greater than 0.5 milliampere was then passed through the emitter and electrolyte to effect the preferential etching of the cavity. The most satisfactory current was from 1.5 to 2.0 milliamperes direct although higher currents were employed in some instances, particularly when the electrolyte was agitated. Alternating current was also used on some specimens to preferentially etch them, the gallium doped gold bond being an effective rectifier and blocking the flow of current while the wafer is cathodic. The etching was facilitated by maintaining the electrolyte at about 65° C. and regular cavities were formed at this temperature with no agitation. Substantially cylindrical cavities as shown in Fig. 5 having the dimensions set forth above were formed using a jet with the electrolyte at 65° C. at a direct current of 1.5 milliamperes for five minutes.

It may be noted here that the etching operation was performed in ordinary room light at about five or ten foot candles intensity without any detrimental effect on the preferential etching operation. It is to be understood that the preferential electrolytic etching of anodically biased n-type semiconductive material by the localized injection of holes in the surface region to be etched generically embraces techniques such as applying high intensity light, as disclosed in Oskar Loosme, Serial No. 400,661, filed December 28, 1953, and now abandoned, or heat to the limited region to be etched as a means of creating the hole carriers controlling the etching.

P-type semiconductive material can be preferentially etched by essentially the same technique as that set forth above for the preferential etching of n-type material. However, the mechanisms involved in the preferential etching of p-type semiconductors are somewhat different from those for n-type materials. No substantial barrier effect is observed at the interface between anodic p-type semiconductors and electrolytes. The principal mechanism enabling preferential etching of p-type material is that of the ohmic flow of current from a point source in a large body. In order that a practical degree of preferential etching occurs, the p-type material should have a greater resistance than the electrolyte in its immediate vicinity so that the electrolyte resistance does not tend to smooth the current distribution at the interface. The resistance to current flow within the semiconductor is then such that the greatest current density is at the electrolyte-semiconductor interface closest to the restricted area electrode and drops off rapidly due to the greater resistance of the longer paths. Thus when a point contact or a restricted area contact such as a bonded nonrectifying contact is made to p-type material and biased positive with respect thereto, a current distribution similar to that disclosed in Figs. 2 through 5 is obtained with the exception that the minority charge carrier diffusion length no longer places a limit on the length of the paths from the point and no space charge layer exists in the semiconductor. Again the greatest current density is immediately under the contact and etching is most rapid in that region. As a cavity forms a greater proportion of the current flows to the electrolyte from its walls and it therefore erodes more rapidly than the remainder of the surface. As with the etching of n-type material the erosion can be concentrated to some extent and accelerated by directing a jet of electrolyte at the desired location. Ordinary room light has no effect on the etching.

A cavity 20 mils across and 15 mils deep can be produced in a 20 mil thick p-type germanium body of 12 ohm-centimeters resistivity in a ten percent potassium hydroxide solution. In preparing the body for etching the surfaces can be polished mechanically and chemically as discussed above and a two mil 99 percent gold-1 percent gallium wire bonded to the surface. The cavity is produced opposite the bonded electrode by passing ten milliamperes of current through the body for one hour while the solution is maintained at 23° C. Cavities have also been produced in two ohm-centimeter p-type material by these techniques.

In general it has been found that preferential etching occurs to a lesser degree on anodic p-type germanium as the resistivity of the material with respect to the resistivity of the etchant decreases. This reduction is attributed to the swamping out of the ohmic distribution of current in the bulk of the semiconductor at the semiconductor-electrolyte interface due to the much greater resistance in the electrolyte at or in the region of the interface. Thus, the cavity preferentially etched by passing the current from a substantially point source into a p-type sample has much sharper walls in a 12-ohm-centimeter sample than in a two ohm-centimeter sample and the cavity in the latter is much sharper than in a 0.2 ohm-centimeter sample. Calculations verified by experiment indicate that the effective limit on the preferential electrolytic etching of p-type material is reached at a resistivity ratio between the semiconductor and the electrolyte of somewhere between 1:10 and 1:100.

A 0.2 ohm-centimeter p-type, single crystal, square wafer of germanium 150 mils on a side and 12 mils thick was preferentially etched for 30 minutes in ten percent potassium hydroxide at room temperature. The etching current was supplied to the wafer through an ohmic contact formed by bonding a two mil gold-gallium wire to the major surface of the wafer opposite that in which the dimple was sought. The passing of 30 milliamperes of current through that contact for 30 minutes, wafer anodic with respect to the electrolyte, reduced the wafer thickness to three mils and produced a dimple opposite the contact leaving one-half mil of wafer thickness at its center and having a diameter of about 50 mils. Since a ten percent potassium hydroxide solution has a resistivity of about 2.6 ohm centimeters, the resistivity ratio between the germanium and the electrolyte in the above example was 1:13.

This invention can be employed with many electrolytes other than the potassium hydroxide solution described. A number of materials have been tried and all have been found to etch semiconductors and to form the desired barrier with anodic n-type semiconductors. The major effort in the practice of this invention has been directed toward the use of various concentrations of alkali hydroxides ranging up to 50 weight percent with no appreciable variations in results. The following electrolytic etchants are exemplary of those which have been successfully employed in the practice of this invention: hydrochloric acid, sulfuric acid, ammonium hydroxide, sodium hydroxide, potassium chloride, potassium hydroxide, and potassium nitrite. Further the invention is applicable to other semiconductors of the elemental type, the intermetallic type, i.e. indium antimonide and aluminum antimonide, and the compound type. In general the invention can be practiced successfully on an n-type semiconductive material forming an effective barrier at its interface with the electrolyte; the characteristics for good barrier formation being a long minority charge carrier lifetime for low reverse currents and a low resistivity for a low dark current. N-type germanium having resistivities from less than 0.2 ohm-centimeter to greater than 12 ohm-centimeters has been etched preferentially by this process. A p-type semiconductive material will preferentially etch electrolytically in accordance with this invention if its resistance is high with respect to the resistance of the electrolyte in the vicinity of the interface.

While the preferential etching techniques described above have been directed toward the formation of a single dimple or cavity having essentially a circular section normal to its depth dimensions it is to be understood that it is within the contemplation of this invention to produce other forms. Thus, for example, elongated depressions either straight or curved can be formed by employing corresponding line contact current sources or emitters. Further, a plurality of current sources or emitters can be employed either simultaneously or successively to produce a plurality of cavities of either circular or elongated form. One use of such a plurality would be in the electrolytic dicing of a slab of semiconductive material wherein a grid of line current sources or emitters is employed or a group of parallel line sources or emitters is employed successively to form an intersecting grid of elongated cavities.

The methods of this invention enable preferential etching to be practiced on surfaces which normally have uniform electrical characteristics and therefore have been applied in the main to single crystal bodies of the elemental semiconductors of a single conductivity type. However, these methods also can be applied advantageously to bodies containing n-p junctions and polycrystalline bodies.

It is to be understood that the above-described arrangements are illustrative of the application of the principles of the invention. Numerous other arrangements may be devised by those skilled in the art without departing from the spirit and scope of the invention.

What is claimed is:

1. The method of producing a cavity in n-type germanium which comprises forming a body of single crystal n-type germanium having a resistivity of about 6 ohm-centimeters, bonding a rectifying connection having a width of about 2 mils on a restricted area of one major surface of said body, masking said one major surface of said body and the rectifying connection with a nonconductive substance impervious to liquid electrolyte, immersing an entire region of the surface opposite said one major surface of said body in a ten percent potassium hydroxide solution, said immersed surface region encompassing and extending beyond the region in which said cavity is sought, agitating the electrolyte in the region of said immersed surface closest to said rectifying connection, and passing a forward current of at least 0.5 milliamperes through said rectifying connection, said body, and said electrolyte.

2. The method of producing a cavity in n-type germanium which comprises forming a germanium body having two major surfaces, applying a rectifying connection on one of said major surfaces directly across the thickness of said body from the region in which the cavity is to be formed, masking said one major surface of said body and the rectifying connection with a nonconductive substance impervious to liquid electrolyte, said one major surface having an area many times greater than the area of said connection, immersing an entire region of said second surface in an electrolyte, said immersed surface region encompassing and extending beyond the region in which said cavity is sought, and passing forward current from said rectifying connection into said germanium and to said electrolyte.

3. The method of producing a cavity in n-type germanium which comprises forming a germanium body having two plane parallel major surfaces, applying a rectifying connection on one of said major surfaces directly across the thickness of said body from the region in which the cavity is to be formed, said one major surface having an area many times greater than the area of said connection, applying an ohmic connection to said body, immersing an entire region of the second major surface of said body in an electrolyte while said connections and said first major surface are isolated from said electrolyte, said immersed surface region encompassing and extending beyond the region in which said cavity is sought, connecting said ohmic connection in circuit to said electrolyte, and passing forward current from said rectifying connection through said germanium and to said electrolyte.

4. The method of preferentially etching an n-type semiconductive body to form a cavity therein which comprises forming the body with a pair of plane parallel surfaces separated by a thickness less than a hole diffusion length, mounting an emitter electrode on one plane surface of said body, said one major surface having an area many times greater than the area of said connection, immersing an entire region of the second plane surface in an electrolyte while said emitter and said one surface are isolated from said electrolyte, said immersed surface region encompassing and extending beyond the region wherein preferential etching action is sought, and biasing said emitter electrode positive with respect to said electrolyte.

5. The method of producing a cavity in a p-type semiconductive body which comprises forming a rectifying connection on one surface of said body, said one major surface having an area many times greater than the area of said connection, immersing an entire region of an opposite surface of said body encompassing and extending beyond the surface portion in which the cavity is sought in an electrolyte, and passing a current from said contact through said body to said electrolyte, said contact being poled positive with respect to said electrolyte.

6. The method of producing a cavity in p-type germanium which comprises forming a p-type germanium body having a resistivity of at least 0.2 ohm-centimeters with a pair of plane parallel surfaces, mounting a rectifying connection on one of said surfaces opposite the region on said other surface in which said cavity is to be produced, said one major surface having an area many times greater than the area of said connection, immersing an entire region of said other surface encompassing and extending beyond the surface portion in which the cavity is sought in an electrolyte, and passing a current through said contact, said body, and said electrolyte while said contact is biased positive with respect to said electrolyte.

7. The method of producing a cavity in a body of semiconductive material which comprises forming a wafer-shaped body of semiconductive material, said body having two major surfaces, at least one of said major surfaces having substantially uniform electrical characteristics thereover, mounting a rectifying connection on said other major surface opposite the portion of said one major surface in which a cavity is to be formed, said other major surface having an area many times greater than the area of said connection, immersing an entire region of said one major surface and encompassing and extending beyond the portion in which said cavity is to be formed in an electrolyte while said connection and said other major surface are isolated from said electrolyte, biasing said body anodically with respect to said electrolyte, and passing a current from said retifying connection through said wafer and to said electrolyte whereby the etching current density is greatest in the portion of said immersed one major surface across said body from said connection.

8. The method of producing a cavity in a body of semiconductive material which comprises forming a wafer-shaped body of semiconductive material, said body having two major surfaces, at least one of said major surfaces having substantially uniform electrical characteristics thereover, applying a rectifying connection on said other major surface opposite the portion of said one major surface in which a cavity is to be formed, said other major surface having an area many times greater than the area of said connection, immersing an entire region of said one major surface and encompassing and extending beyond the portion in which said cavity is to be formed in an electrolyte while said connection and at least the surrounding area of said other major surface are isolated from said electrolyte, biasing said body anodically with respect to said electrolyte, and passing a current from said rectifying connection through said wafer and to said electrolyte whereby the etching current density is greatest in the portion of said immersed one major surface across said body from said connection.

References Cited in the file of this patent

UNITED STATES PATENTS

| | | |
|---|---|---|
| 607,484 | Rieder | July 19, 1898 |
| 1,416,929 | Bailey | May 23, 1922 |
| 2,656,496 | Sparks | Oct. 20, 1953 |

OTHER REFERENCES

Transactions of the I.R.E., vol. 41, No. 12, rec'd December 11, 1953, pp. 1706–1708, Tiley et al.

"Semi-Conducting Materials," published in 1951 by Butterworth's Scientific Publications (London), pages 31–33.